US012606283B2

(12) United States Patent
Rytter

(10) Patent No.: US 12,606,283 B2
(45) Date of Patent: Apr. 21, 2026

(54) FLOATING FOUNDATION FOR WIND TURBINES AND METHOD FOR MANUFACTURING A FLOATING FOUNDATION FOR WIND TURBINES

(71) Applicant: Leicon ApS, Horsens (DK)

(72) Inventor: Frederik Rytter, Viborg (DK)

(73) Assignee: Leicon ApS, Horsens (DK)

( * ) Notice: Subject to any disclaimer, the term of this patent is extended or adjusted under 35 U.S.C. 154(b) by 412 days.

(21) Appl. No.: 18/374,361

(22) Filed: Sep. 28, 2023

(65) Prior Publication Data

US 2024/0025522 A1     Jan. 25, 2024

Related U.S. Application Data

(63) Continuation of application No. PCT/DK2022/050065, filed on Mar. 29, 2022.

(30) Foreign Application Priority Data

Mar. 30, 2021     (DK) ............................ PA 2021 00333

(51) Int. Cl.
*B63B 75/00*     (2020.01)
*B63B 35/44*     (2006.01)
*F03D 13/25*     (2016.01)

(52) U.S. Cl.
CPC .............. *B63B 75/00* (2020.01); *B63B 35/44* (2013.01); *B63B 2035/4466* (2013.01); *B63B 2231/52* (2013.01); *F03D 13/256* (2023.08); *F05B 2240/93* (2013.01)

(58) Field of Classification Search
CPC ..... B63B 75/00; B63B 2231/52; B63B 35/44; F03D 13/30; F05B 2240/93
See application file for complete search history.

(56) References Cited

U.S. PATENT DOCUMENTS

| | | | |
|---|---|---|---|
| 10,953,962 B2 * | 3/2021 | Le Gleau | ................ B63B 35/38 |
| 2005/0281999 A1 | 12/2005 | Hofmann et al. | |
| 2011/0150661 A1 | 6/2011 | Robbins et al. | |
| 2012/0155967 A1 * | 6/2012 | Nagurny | ................ F03D 13/25 |
| | | | 405/224 |

(Continued)

FOREIGN PATENT DOCUMENTS

| | | |
|---|---|---|
| CN | 109895284 A | 6/2019 |
| CN | 110158638 A | 8/2019 |

(Continued)

OTHER PUBLICATIONS

Jensen J.P., "Evaluating the environmental impacts of recycling wind turbines," Wind Energy 22(2):316-326, 2019.

*Primary Examiner* — Joshua E Freeman

(74) *Attorney, Agent, or Firm* — Elevated IP, LLC

(57)     ABSTRACT

A method for manufacturing a floating foundation for a wind turbine, wherein the floating foundation comprises load carrying structures and a plurality of air pontoons attached to the load carrying structures, is disclosed. The method includes cutting one or more fiber-reinforced composite structures, such as wind turbine blades, into a plurality of smaller pieces comprising fiber-reinforced composite, molding the air pontoons from the smaller pieces, and attaching the air pontoons to the load carrying structures.

20 Claims, 6 Drawing Sheets

(56)        References Cited

U.S. PATENT DOCUMENTS

| 2013/0233231 | A1* | 9/2013 | Dagher | B63B 75/00 |
| | | | | 114/265 |
| 2015/0225529 | A1* | 8/2015 | Weyant | B29B 17/0412 |
| | | | | 524/601 |
| 2017/0051724 | A1* | 2/2017 | Dagher | B63B 5/24 |
| 2017/0362406 | A1* | 12/2017 | Li | C08J 5/043 |
| 2018/0105235 | A1 | 4/2018 | Zou et al. | |
| 2019/0283845 | A1* | 9/2019 | Gudesen | A01K 61/60 |
| 2020/0062351 | A1* | 2/2020 | Le Gleau | F03D 13/25 |
| 2020/0269960 | A1* | 8/2020 | Boo | B63B 39/00 |
| 2021/0058022 | A1* | 2/2021 | Forrest | B63B 35/44 |

FOREIGN PATENT DOCUMENTS

| CN | 212717000 | U | 3/2021 |
| FR | 3086636 | A1 | 4/2020 |
| JP | 2006002527 | A | 1/2006 |
| NO | 20200815 | A1 | 3/2021 |
| WO | 2009064737 | A1 | 5/2009 |
| WO | 2012061710 | A2 | 5/2012 |
| WO | 2013010957 | A1 | 1/2013 |
| WO | 2019224535 | A1 | 11/2019 |
| WO | 2020028914 | | 2/2020 |

* cited by examiner

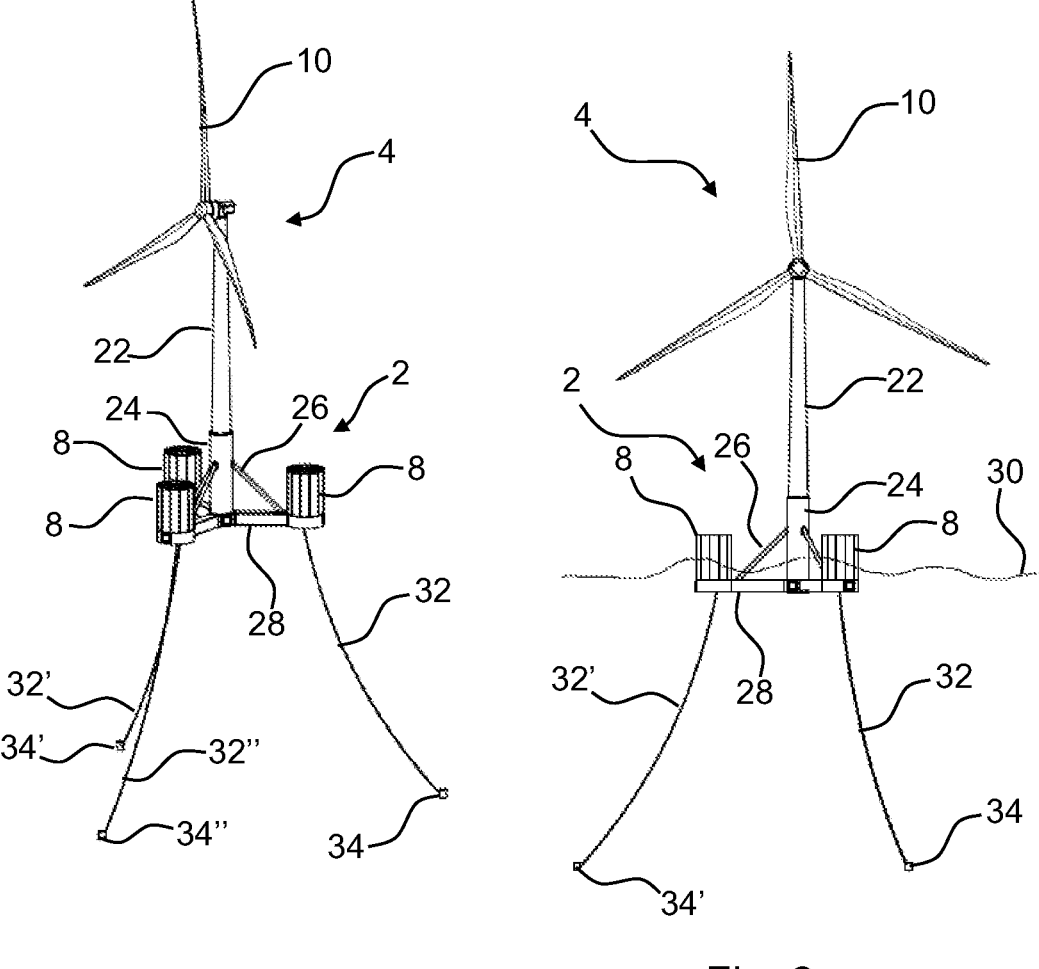
Fig. 1                    Fig. 2

FLOATING FOUNDATION FOR WIND TURBINES AND METHOD FOR MANUFACTURING A FLOATING FOUNDATION FOR WIND TURBINES

CROSS-REFERENCE TO RELATED APPLICATIONS

This application is a continuation under 35 U.S.C. 111 of International Patent Application No. PCT/DK2022/050065, filed Mar. 29, 2022, which claims the benefit of and priority to Danish Application No. PA 2021 00333, filed Mar. 30, 2021, each of which is hereby incorporated by reference in its entirety.

FIELD OF INVENTION

The present invention relates to a method for manufacturing a floating foundation for wind turbines. The present invention also relates to a floating foundation for wind turbines.

BACKGROUND

Floating foundations for wind turbines are widely used as an alternative to foundations that are supported by the seabed. These types of foundations are used for floating offshore wind turbines. When the depth of water exceeds 50 meters, floating foundations are competitive with conventional foundations that are supported by the seabed.

A typical floating foundation comprises air pontoons that are attached to load bearing structures of the floating foundation. The air pontoons are typically welded in steel. Accordingly, the manufacturing process is expensive, and the weight of the air pontoons is high.

Furthermore, the production is typically not environmentally friendly.

US 2018/105235 A1 discloses a floating foundation comprising air pontoons that are produced by fiber-reinforced composite materials.

This solution solves the issue of the weight of the air pontoons being high. However, it still does not solve the issue of the production not being environmentally friendly.

CN 212717000 U discloses a buoy structure suitable for a floating fan foundation, which comprises a buoy body, an upright post, an encircling snap ring and a partition plate. The partition plate is arranged on the upright post. A plurality of clamping positions for fixing the buoy body are arranged on the partition plate. The buoy body is vertically arranged around the upright post through the clamping positions of the partition plate. The buoy body is bundled and fixed on the partition plate through the encircling snap ring. This solution does, however, not provide an environmentally friendly way to produce the buoy structure.

Accordingly, it is desirable to have an alternative that is more flexible and friendly to the environment.

Thus, there is a need for an alternative method for manufacturing a floating foundation for wind turbines, which method reduces or even eliminates the above-mentioned disadvantages of the prior art.

BRIEF DESCRIPTION

It is an object of the invention to provide an alternative method for manufacturing a floating foundation for wind turbines, which method reduces or even eliminates the above-mentioned disadvantages of the prior art.

It is also an object of the invention to provide a floating foundation for wind turbines, which floating foundation reduces or even eliminates the above-mentioned disadvantages of the prior art.

A method for manufacturing a floating foundation for a wind turbine is disclosed herein, wherein the floating foundation comprises load carrying structures and a plurality of air pontoons attached to the load carrying structures, wherein each air pontoon is attached to a base portion of the load carrying structures, wherein the method comprises the following steps:

a) cutting one or more fiber-reinforced composite structures into a plurality of smaller pieces comprising fiber-reinforced composite material;

b) molding the air pontoons from the smaller pieces; and c) attaching the air pontoons to the load carrying structures, wherein the step of molding the air pontoons from the smaller pieces comprises the following steps:

filling a quantity of smaller pieces and resin into a mold;

closing the mold;

opening the mold; and removing the molded air pontoon from the mold, wherein the mechanical properties of the smaller pieces are determined prior to molding the air pontoon, wherein the wall thicknesses of the air pontoon are selected in such a manner that the mechanical strength of the air pontoon is equal to or above a predefined selected level.

Hereby, it is possible to provide an alternative method for manufacturing a floating foundation for wind turbines, which method reduces or even eliminates the above-mentioned disadvantages of the prior art.

The method makes it possible to lower the weight of the air pontoons.

In an embodiment, the one or more fiber-reinforced composite structures include wind turbine blades.

Hereby, the method makes it possible to recycle fiberglass from wind turbine blades and other fiber-reinforced composite materials. Accordingly, the method is environmentally friendly. It should be emphasized that an increasing number of wind turbine blades need to be replaced and that a method disclosed herein makes it possible to use scrapped (discarded) fiber-reinforced composite structures such as wind turbine blades in a new floating foundation for wind turbines.

The fiber-reinforced composite structures may be any type of objects made by recyclable fiber-reinforced composite.

The floating foundation comprises load carrying structures and a plurality of air pontoons attached to the load carrying structures.

It may be an advantage that the load carrying structures are heavy in order to minimize the accelerations of the floating foundation caused by impacts transferred to the load carrying structures from the tower of the wind turbine.

In an embodiment, the load carrying structures are at least partly made of concrete. In an embodiment, the load carrying structures are at least partly made of reinforced concrete.

Each air pontoon is attached to a base portion of the load carrying structures.

In an embodiment, each air pontoon is attached to a base portion of the load carrying structures by mechanical structures allowing each air pontoon to be detachably attached to a mounting portion integrated in or attached to the base portion of the load carrying structures.

In an embodiment, the method comprises the step of cutting one or more fiber-reinforced composite structures into a plurality of smaller pieces comprising fibers.

In an embodiment, the one or more fiber-reinforced composite structures comprise one or more wind turbine blades.

This step may be done in a location different from the location where additional steps of the method are carried out.

In an embodiment, the method comprises the step of molding the air pontoons from the smaller pieces. Hereby, it is possible to use scrapped (discarded) wind turbine blades and other fiber-reinforced composite materials in the floating foundation.

In an embodiment, the method comprises the step of attaching the air pontoons to the load carrying structures. The attachment of the the air pontoons to the load carrying structures may be done by using any suitable means. In an embodiment, the attachment is established by using mechanical structures that are brought into engagement with fixation structure in the air pontoons and fixation structures in the load carrying structures.

By the term cutting is meant a procedure by which one or more fiber-reinforced composite structures (e.g. one or more wind turbine blades) are split into smaller portions. The cutting procedure may be done my using any suitable cutting tools.

The step of molding each air pontoon from the smaller pieces comprises the following steps:
   a) filling a quantity of smaller pieces and resin into a mold;
   b) closing the mold;
   c) opening the mold; and
   d) removing the molded air pontoon from the mold.

In an embodiment, the method comprises the step of applying a pressure towards the air pontoon segments of the air pontoon, while the mold is closed.

In an embodiment, the method comprises the step of heating up the mold while the mold is closed and/or prior to closing the mold. Hereby, it is possible to accelerate the curing process.

In an embodiment, the method comprises the step of applying ultraviolet light to accelerate the curing process. Hereby, it is possible to accelerate the curing process.

The method comprises the step of determining the mechanical properties of the smaller pieces prior to molding the air pontoon, wherein the wall thicknesses of the air pontoon are selected in such a manner that the mechanical strength of the air pontoon is equal to or above a predefined selected level.

Hereby, it is possible to ensure that the mechanical strength of the air pontoon is sufficiently large.

In an embodiment, the method comprises the step of adding additional fibers into the mold in order to increase the strength of the air pontoon. Hereby, it is possible to ensure that the mechanical strength of the air pontoon is sufficiently large.

The additional fibers may include glass fibers, aramid fibers or carbon fibers, by way of example.

In an embodiment, the method comprises the step of manufacturing the floating foundation as a plurality of modular components, wherein the modular components are configured to be attached to each other by using mechanical structures.

Hereby, storage and transport of the floating foundation is eased.

A floating foundation for a wind turbine is disclosed herein, wherein the floating foundation comprises load carrying structures and a plurality of air pontoons attached to the load carrying structures, wherein the air pontoons are made from recycled fiber-reinforced composite from one or more fiber-reinforced composite structures, wherein the floating foundation is manufactured in a manner, in which
   a) one or more fiber-reinforced composite structures are cut into a plurality of smaller pieces comprising fiber-reinforced composite material;
   b) the air pontoons are molded from the smaller pieces; and
   c) the air pontoons are attached to the load carrying structures, wherein the mechanical properties of the smaller pieces are determined prior to molding the air pontoon, wherein the wall thicknesses of the air pontoon are selected in such a manner that the mechanical strength of the air pontoon is equal to or above a predefined selected level.

Hereby, it is possible to provide a floating foundation for wind turbines, which method reduces or even eliminates the above-mentioned disadvantages of the prior art.

In an embodiment, the one or more fiber-reinforced composite structures include one or more wind turbine blades.

In an embodiment, the fiber-reinforced composite comprises glass fibers.

In an embodiment, each air pontoon comprises a plurality of air pontoon segments that are attached to each other. Hereby, it is possible to produce the air pontoons in a practical way.

In an embodiment, the air pontoons are air-filled.

In an embodiment, each air pontoon is sealed in order to prevent water from entering into the air pontoon when the floating foundation is submerged into water.

In an embodiment, the air pontoons are hermetically sealed.

In an embodiment, each air pontoon comprises an attachment portion that is arranged and configured to be brought into engagement with a corresponding attachment member arranged at the base portion.

In an embodiment, the base portion is made of reinforced and pre-tensioned concrete.

In an embodiment, the base portion comprises several base portion segments that are configured to be mechanically attached to each other by using fastening structures that are integrated in the base portion, wherein the floating foundation is configured to be arranged in:
   a) a first disassembled configuration, in which the base portion segments of the base portion and the air pontoons have not been attached to each other; and
   b) a second assembled configuration, in which the base portion segments of the base portion and the air pontoons have been attached to each other to form an assembled floating foundation.

BRIEF DESCRIPTION OF THE DRAWINGS

The contents of this disclosure will become more fully understood from the detailed description given herein below. The accompanying drawings are given by way of illustration only, and thus, they are not limitative of the present invention. In the accompanying drawings:

FIG. 1 shows a side view of a floating foundation according to an embodiment;

FIG. 2 shows another side view of the floating foundation shown in FIG. 1;

DETAILED DESCRIPTION

Figures 3, 4:
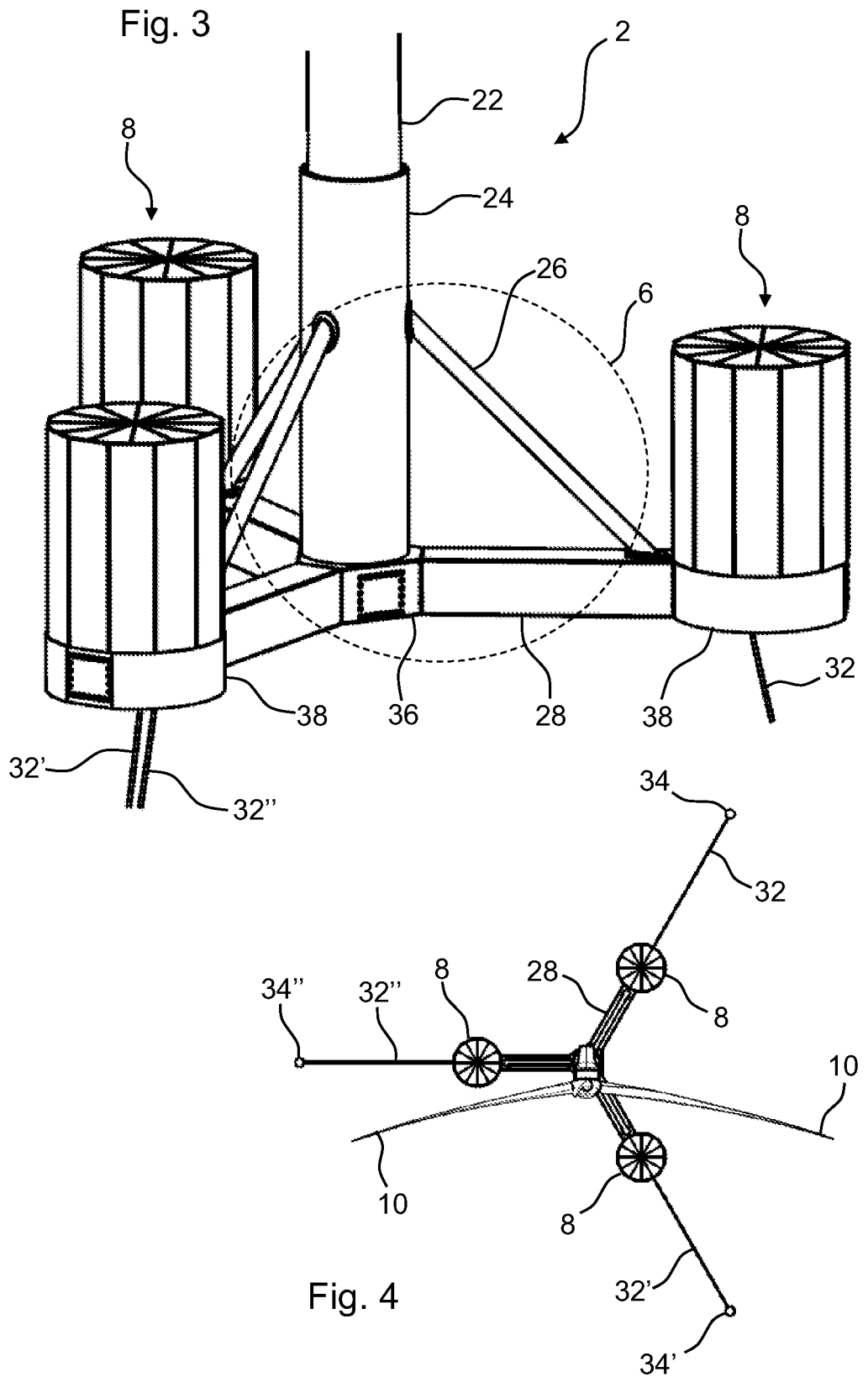
FIG. 3 shows a close-up view of the load carrying structures of the floating foundation shown in FIG. 1 and FIG. 2.
FIG. 4 shows a top view of the perspective view of the floating foundation shown in FIG. 1 and FIG. 2.

Referring now in detail to the drawings for the purpose of illustrating embodiments of the present invention, a floating foundation 2 is illustrated in FIG. 1.

FIG. 1 is a schematic side view of a floating foundation 2 according to an embodiment. The floating foundation 2 comprises load carrying structures formed as a base portion 28 and a centrally arranged tubular member 24 protruding upwardly from the base portion 28. A plurality of cross members 26 extend between the base portion 28 and the tubular member 24. The cross members 26 support the tubular member 24 by transferring horizontal loads to the base portion 28.

The floating foundation 2 comprises a plurality of air pontoons 8 that are attached to a base portion 28. The air pontoons 8 are manufactured from fiberglass recycled from wind turbine blades.

The base portion 28 is fixed to anchor members 34, 34', 34" by wires 32, 32', 32". The anchor members 34, 34', 34" are arranged on or fixed to the seabed. A tower 22 of a wind turbine 4 is attached to the tubular member 24. The wind turbine 4 comprises blades 10.

FIG. 2 illustrates another side view of the floating foundation 2 shown in FIG. 1. The floating foundation 2 is floating in water. The air pontoons 8 provide upward forces that keep the floating foundation 2 floating in the water. It can be seen that the base portion 28 is arranged below the water level 30.

FIG. 3 illustrates a close-up view of the load carrying structures 24, 26, 28 of the floating foundation shown in FIG. 1 and FIG. 2. The base portion 28 comprises three base segments that are attached to and protrude from a central connection portion 36. A support portion 38 is arranged at the distal end of each base segment of the base portion 28. Each of the support portions 38 is arranged and configured to receive an air pontoon 8. Attachment of the air pontoons

8 to the support portions 38 may be carried out by using various types of engaging fixation structures provided at the support portions 38 and at the air pontoons 8. In an embodiment, attachment of an air pontoon 8 to a support portion 38 may be carried out by screwing one or more screws into a corresponding number of bores extending through the support portion 38 and through a portion of the underlying air pontoon 8.

It can be seen that a wire 32, 32', 32" is attached to each support portion 38. In an embodiment, a wire 32, 32', 32" is attached to the bottom portion of each support portion 38.

A cross member 26 extends between the tubular member 24 and each base segment of the base portion 28. Each cross member 26 is fixed to the top side of the base segment to which it is attached. The point of fixation is placed adjacent to the support portion 38. Hereby, it is possible to apply a long cross member 26. In an embodiment, the angle between the cross member 26 and the tubular member 24 is about 45 degrees. It can be seen that a tower 22 has been received by the tubular member 24.

FIG. 4 illustrates a top view of the perspective view of the floating foundation 2 shown in FIG. 1, FIG. 2 and FIG. 3. It can be seen that the floating foundation 2 comprises three base segments that are evenly distributed around the central portion of the floating foundation 2. Accordingly, the angle between adjacent base segments is 120 degrees.

Figures 5, 6, 7:
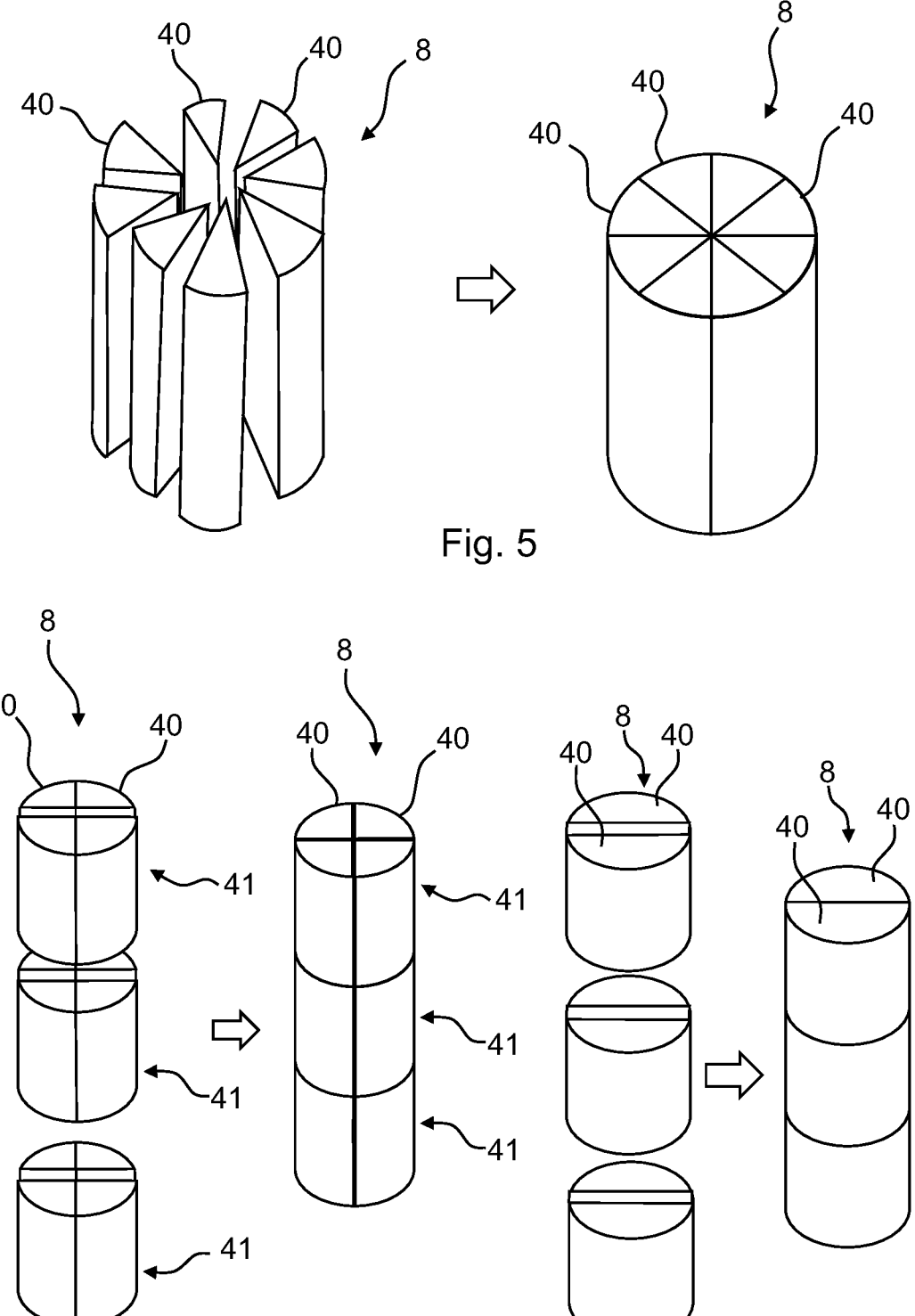
FIG. 5 shows a perspective top view of a segmented air pontoon of a floating foundation according to an embodiment.
FIG. 6 shows a perspective top view of a segmented air pontoon of a floating foundation according to an embodiment.
FIG. 7 shows a perspective top view of a segmented air pontoon of a floating foundation according to an embodiment.

FIG. 5 illustrates a perspective top view of a segmented air pontoon 8 of a floating foundation according to an embodiment. The air pontoon 8 initially comprises a plurality of air pontoon segments 40 (see the left side of FIG. 5) that are joined to form an air pontoon 8 (shown on the right side of FIG. 5). Each air pontoon segment constitutes an eighth of a cylinder.

In an embodiment, the air pontoon segments 40 are equally sized.

It is possible to vary the number of air pontoon segments 40.

FIG. 6 illustrates a perspective top view of a segmented air pontoon 8 of a floating foundation according to an embodiment. The segmented air pontoon 8 comprises three layers. Each layer 41 comprises four air pontoon segments 40 shaped as quarters of a cylinder. At the left side, three layers 41 of segments 8 are spaced from each other. At the right side, the air pontoon segments 40 have been attached to each other.

In an embodiment, the air pontoon segments 40 are equally sized.

FIG. 7 illustrates a perspective top view of a segmented air pontoon 8 of a floating foundation according to an embodiment. The segmented air pontoon 8 comprises three layers. Each layer 41 comprises two air pontoon segments 40 shaped as semi cylinders. At the left side, three layers of segments 8 are spaced from each other. At the right side, the segments have been attached to each other. It may be an advantage that the air pontoon segments 40 are equally sized.

For all segments shown in FIG. 5, FIG. 6 and FIG. 7 it is possible to attach the air pontoon segments 40 to each other by glue, for example. In an embodiment, the air pontoon segments 40 are attached to each other during a molding process.

The molding process may comprise the following steps:
Opening a mold;
Placing the air pontoon segments 40 in a mold;
Closing the mold;
Injecting resin into the mold; and Opening the mold and removing the molded air pontoon 8.

Figure 8:
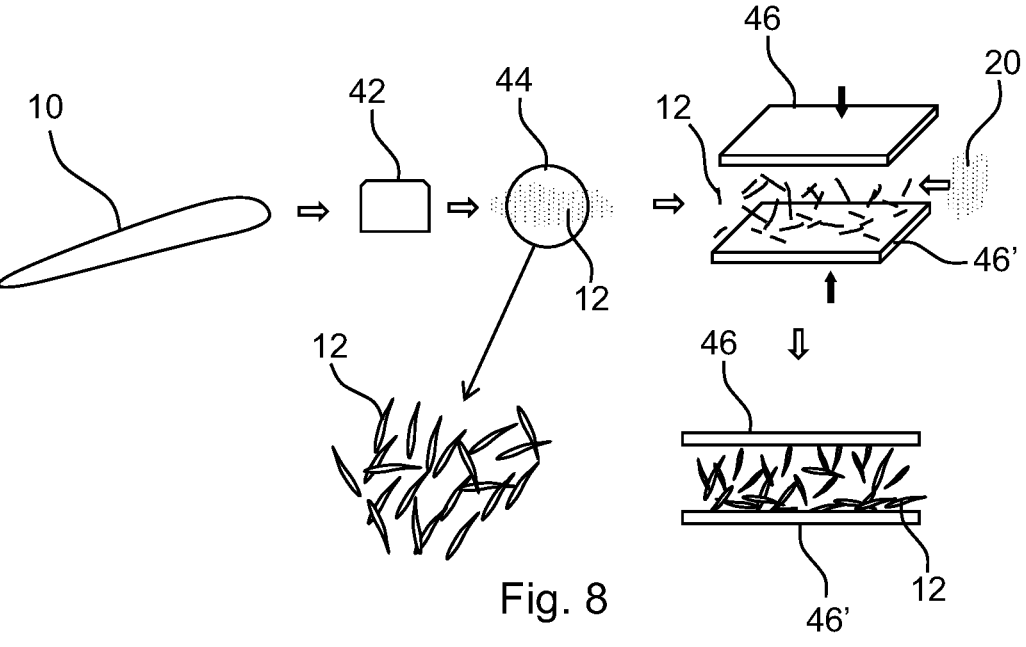
FIG. 8 shows a schematic view of steps of a method according to an embodiment.

FIG. 8 illustrates a schematic view of the steps of a method according to an embodiment.

In the first step, a wind turbine blade 10 is cut into smaller pieces using a cutting tool 42. In an embodiment, the cutting tool 42 is used to cut the wind turbine blade 10 into pieces having a length that is 2 meters or less. The cutting tool 42 may be any tool that is suitable for cutting the wind turbine into smaller pieces. In an embodiment, the cutting tool 42 is a power saw.

In the second step, the pieces that are cut during the first step are cut into smaller pieces 12 using a cutting device 44. In an embodiment, the smaller pieces 12 may have a length in the range 5-50 mm.

In the third step, the smaller pieces 12 that are cut during the second step are used to mold an air pontoon. As shown in FIG. 8, the molding of the air pontoon 8 is produced by molding a plurality of air pontoon segments that can be joined to form an air pontoon. Each air pontoon segment is molded by sandwiching smaller pieces 12 between two spaced apart mats 46, 46' and adding resin 20 to the smaller pieces 12. In an embodiment, glass fibers or other types of fibers (aramid fibers or carbon fibers) are added in order to increase the strength of the air pontoon.

In the fourth step, pressure is provided to form the air pontoon segment or the air pontoon. Heating and/or ultraviolet light may be used to accelerate the curing process.

Figure 9:
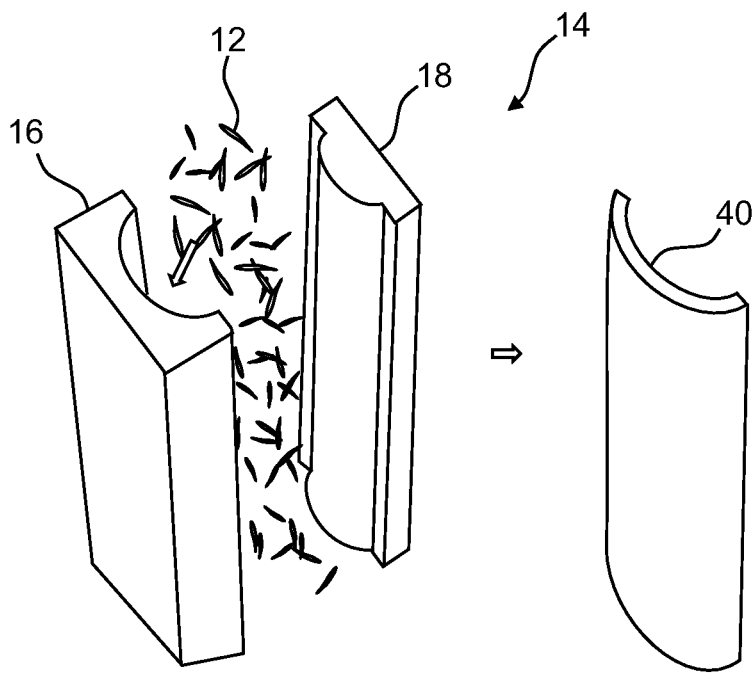
FIG. 9 shows a schematic view of a step of a method according to an embodiment.

FIG. 9 illustrates a schematic view of a step of a method according to an embodiment. Small pieces 12 of recycled wind turbine blades and resin are injected into a mold 14 having a first mold portion 16 and a second mold portion 18. When the air pontoon segment 40 has cured, the mold 14 is opened and the air pontoon segment 40 is removed from the mold 14. The method may comprise further steps, in which a plurality of air pontoon segments 40 are joined to form an air pontoon. An air pontoon 8 may comprise air pontoon segments of different shapes.

Figures 10A, 10B, 10C:
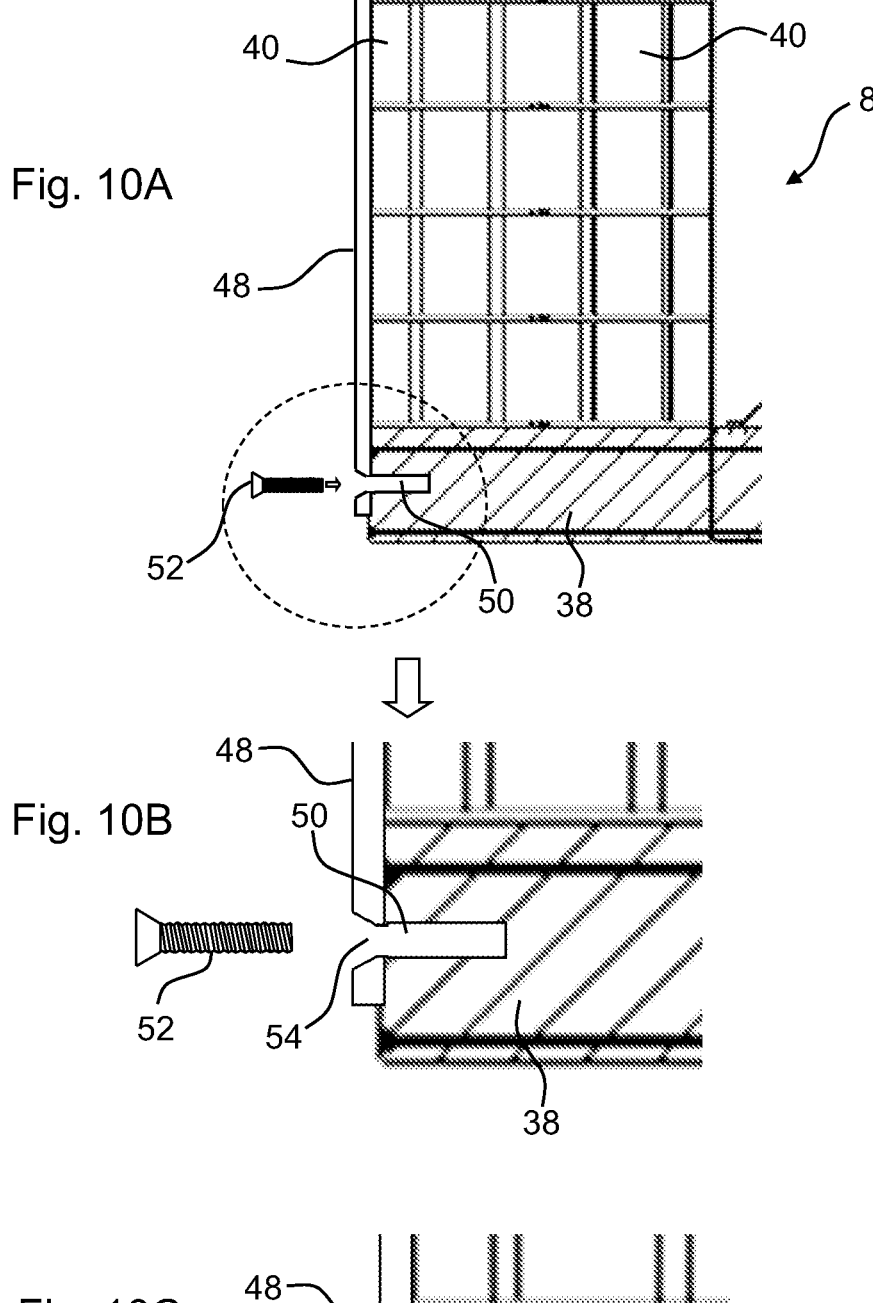
FIG. 10A shows a cross-sectional view of an air pontoon attached to a base portion of a floating foundation according to an embodiment.
FIG. 10B shows a first cross-sectional close-up view of a portion of the air pontoon shown in FIG. 10A.
FIG. 10C shows a second cross-sectional close-up view of a portion of the air pontoon shown in FIG. 10A.

FIG. 10A illustrates a cross-sectional view of an air pontoon 8 attached to a support portion 38 that is arranged in the distal end of each base portion segment of a base portion of a floating foundation 2 according to an embodiment. FIG. 10B illustrates a first cross-sectional close-up view of a portion of the air pontoon 8 shown in FIG. 10A. FIG. 10C illustrates a second cross-sectional close-up view of a portion of the air pontoon 8 shown in FIG. 10A.

The air pontoon 8 comprises a plurality of air-filled air pontoon segments 40. The air pontoon segments 40 are joined to form an air pontoon 8 constituting a one-piece body. The air pontoon 8 comprises an attachment portion 48 provided with a through bore 54. The underlying support portion 38 is provided with a threaded bore 50 that is arranged and configured to receive a screw 52 provided with a corresponding outer thread.

In FIG. 10A and in FIG. 10B, the screw 52 has not yet been screwed into the threaded bore 50 in the support portion 38.

In FIG. 10C, however, the screw 52 has been screwed into the threaded bore 50 in the support portion 38. Hereby, the screw 52 is used to fix the attachment portion 48 and thus the air pontoon 8 to the support portion 38.

It is important to emphasize that the air pontoon 8 can be attached to the support portion 38 in various other ways.

Figure 11B:
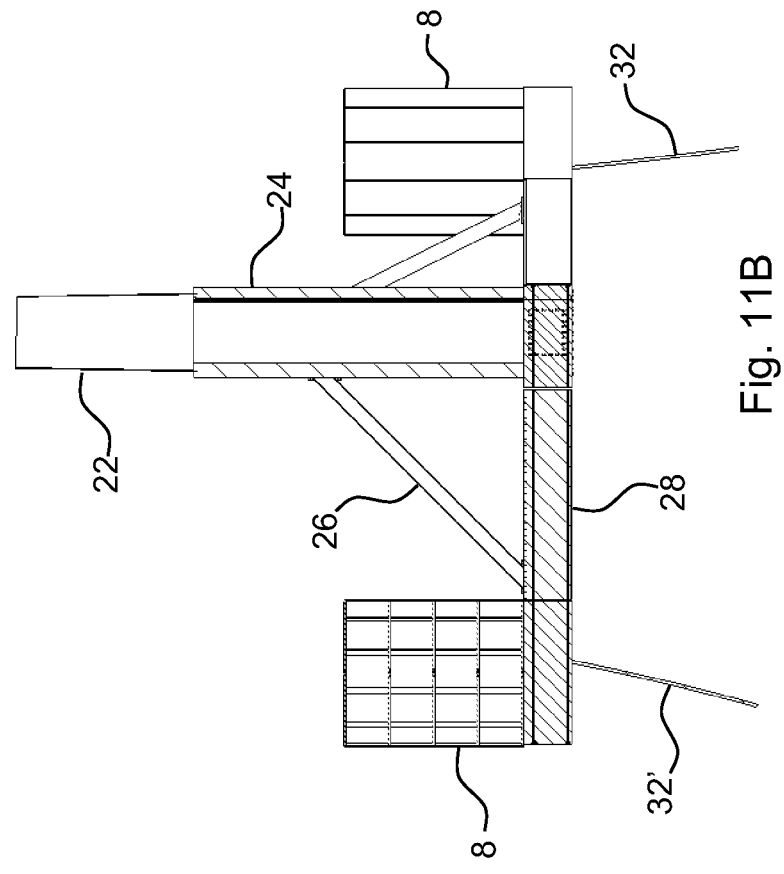
FIG. 11B shows a close-up cross-sectional view of the floating foundation shown in FIGS. 10A-10C.
Figure 11A:
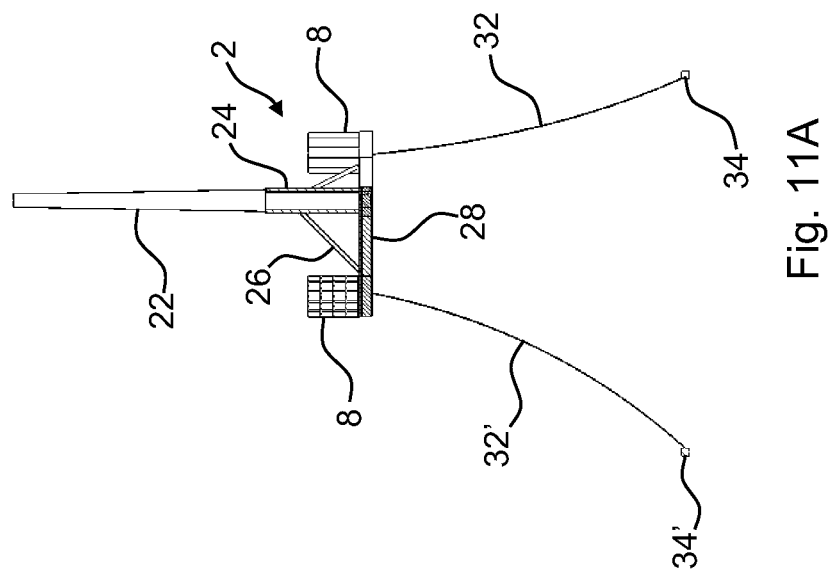
FIG. 11A shows a cross-sectional view of a floating foundation shown in FIG. 1 and FIG. 2.

FIG. 11A illustrates a cross-sectional view of a floating foundation 2 shown in FIG. 1 and FIG. 2. FIG. 11B illustrates a close-up cross-sectional view of the floating foundation 2 shown in FIGS. 10A-10C.

The floating foundation 2 comprises load carrying structures formed as a base portion 28 and a centrally arranged tubular member 24 protruding upwardly from the base portion 28. The load carrying structures correspond to the one shown in and explained with reference to FIG. 1 and FIG. 2. The load carrying structures include a plurality of cross members 26 that are arranged and configured to support the tubular member 24 by transferring horizontal loads to the base portion 28. The cross members 26 extend between the base portion 28 and the tubular member 24.

The floating foundation 2 comprises a plurality of air pontoons 8 that are manufactured from fiberglass recycled from wind turbine blades. The air pontoons 8 are attached to a base portion 28.

The base portion 28 is attached to anchor members 34, 34' by wires 34, 34'. The anchor members 34, 34', 34" are configured to be arranged on or fixed to the seabed. The floating foundation 2 comprises a tubular member 24 that is arranged and configured to receive a tower 22 of a wind turbine. It can be seen that a tower 22 of a wind turbine has been received by and thus is attached to the tubular member 24.

Each of the air pontoons 8 comprises a plurality of segments that are joined to constitute the air pontoon 8. In an embodiment, the segments of the air pontoons 8 are filled with a media having a lower density than water. In a n embodiment, the segments of the air pontoons 8 are air-filled. It is important that each air pontoon 8 is sealed in order to prevent water from entering into the air pontoon 8.

In an embodiment, each air pontoon 8 is hermetically sealed.

LIST OF REFERENCE NUMERALS

2 Floating foundation
4 Wind turbine
6 Load carrying structure
8 Air pontoon
10 Wind turbine blade
12 Small pieces
14 Mold
16 First mold portion
18 Second mold portion
20 Resin
22 Tower
24 Tubular member
26 Cross member
28 Base portion
30 Water level
32, 32', 32" Wire
34, 34', 34" Anchor member
36 Central connection portion
38 Support portion
40 Air pontoon segment
41 Layer
42 Cutting tool
44 Cutting device
46, 46' Mat
48 Attachment portion
50 Attachment member
52 Fixation structure
54 Attachment member

What is claimed is:

1. A method for manufacturing a floating foundation for a wind turbine, the floating foundation comprising load carrying structures and a plurality of air pontoons attached to the load carrying structures, wherein each air pontoon is attached to a base portion of the load carrying structures, wherein the method comprises:

a) cutting one or more fiber-reinforced composite structures into a plurality of smaller pieces comprising fiber-reinforced composite material;

b) molding the air pontoons from the smaller pieces; and c) attaching the air pontoons to the load carrying structures, wherein the step of molding the air pontoons from the smaller pieces comprises:

filling a quantity of smaller pieces and resin into a mold;

closing the mold;

opening the mold; and removing the molded air pontoon from the mold, wherein mechanical properties of the smaller pieces are determined prior to molding the air pontoon and wall thicknesses of the air pontoon are selected such that a mechanical strength of the air pontoon is equal to or above a predefined selected level.

2. The method according to claim 1, further comprising adding additional fibers into the mold in order to increase the mechanical strength of the air pontoon.

3. The method according to claim 1, further comprising manufacturing the floating foundation as a plurality of modular components, wherein the modular components are configured to be attached to each other by mechanical structures.

4. A floating foundation for a wind turbine, the floating foundation comprising load carrying structures and a plurality of air pontoons attached to the load carrying structures, wherein the air pontoons are made from recycled one or more fiber-reinforced composite structures, wherein the floating foundation is manufactured in a manner, in which a) one or more fiber-reinforced composite structures are cut into a plurality of smaller pieces comprising fiber-reinforced composite material;

b) the air pontoons are molded from the smaller pieces; and c) the air pontoons are attached to the load carrying structures, wherein mechanical properties of the smaller pieces are determined prior to molding the air pontoon and wall thicknesses of the air pontoon are selected such that a mechanical strength of the air pontoon is equal to or above a predefined selected level.

5. The floating foundation according to claim 4, wherein each air pontoon comprises a plurality of air pontoon segments that are attached to each other.

6. The floating foundation according to claim 5, wherein the air pontoons are hermetically sealed.

7. The floating foundation according to claim 5, wherein each air pontoon comprises an attachment portion that is arranged and configured to be brought into engagement with a corresponding attachment member arranged at a base portion.

8. The floating foundation according to claim 7, wherein the base portion is made of reinforced and pre-tensioned concrete.

9. The floating foundation according to claim 8, wherein the base portion comprises several base portion segments that are configured to be mechanically attached to each other by fastening structures that are integrated in the base portion, wherein the floating foundation is configured to be arranged in:

a) a first disassembled configuration, in which the base portion segments of the base portion and the air pontoons have not been attached to each other; and b) a second assembled configuration, in which the base portion segments of the base portion and the air pontoons have been attached to each other to form an assembled floating foundation.

10. The floating foundation according to claim 7, wherein the base portion comprises several base portion segments that are configured to be mechanically attached to each other by fastening structures that are integrated in the base portion, wherein the floating foundation is configured to be arranged in:

a) a first disassembled configuration, in which the base portion segments of the base portion and the air pontoons have not been attached to each other; and b) a second assembled configuration, in which the base portion segments of the base portion and the air pontoons have been attached to each other to form an assembled floating foundation.

11. The floating foundation according to claim 4, wherein the air pontoons are air-filled.

12. The floating foundation according to claim 11, wherein the air pontoons are hermetically sealed.

13. The floating foundation according to claim 4, wherein the air pontoons are hermetically sealed.

14. The floating foundation according to claim 13, wherein each air pontoon comprises an attachment portion that is arranged and configured to be brought into engagement with a corresponding attachment member arranged at a base portion.

15. The floating foundation according to claim 14, wherein the base portion is made of reinforced and pre-tensioned concrete.

16. The floating foundation according to claim 14, wherein the base portion comprises several base portion segments that are configured to be mechanically attached to each other by fastening structures that are integrated in the base portion, wherein the floating foundation is configured to be arranged in:

a) a first disassembled configuration, in which the base portion segments of the base portion and the air pontoons have not been attached to each other; and b) a second assembled configuration, in which the base portion segments of the base portion and the air pontoons have been attached to each other to form an assembled floating foundation.

17. The floating foundation according to claim 4, wherein each air pontoon comprises an attachment portion that is arranged and configured to be brought into engagement with a corresponding attachment member arranged at a base portion.

18. The floating foundation according to claim 17, wherein the base portion is made of reinforced and pre-tensioned concrete.

19. The floating foundation according to claim 18, wherein the base portion comprises several base portion segments that are configured to be mechanically attached to each other by fastening structures that are integrated in the base portion, wherein the floating foundation is configured to be arranged in:

a) a first disassembled configuration, in which the base portion segments of the base portion and the air pontoons have not been attached to each other; and b) a second assembled configuration, in which the base portion segments of the base portion and the air pontoons have been attached to each other to form an assembled floating foundation.

20. The floating foundation according to claim 17, wherein the base portion comprises several base portion segments that are configured to be mechanically attached to each other by fastening structures that are integrated in the base portion, wherein the floating foundation is configured to be arranged in:

a) a first disassembled configuration, in which the base portion segments of the base portion and the air pontoons have not been attached to each other; and b) a second assembled configuration, in which the base portion segments of the base portion and the air pontoons have been attached to each other to form an assembled floating foundation.

\* \* \* \* \*